United States Patent [19]

Asprey et al.

[11] Patent Number: 5,193,200
[45] Date of Patent: Mar. 9, 1993

[54] COMPUTER-MONITOR EXTENDED RANGE COMMUNICATIONS LINK FOR ATTENUATING AND SUBSEQUENTLY RESTORING HIGH FREQUENCY COMPONENTS OF TRANSMITTED VIDEO SIGNALS

[75] Inventors: Robert R. Asprey, Harvest; Remigius G. Shatas, Huntsville, both of Ala.

[73] Assignee: Cybex Corporation, Huntsville, Ala.

[21] Appl. No.: 447,010

[22] Filed: Dec. 5, 1989

Related U.S. Application Data

[63] Continuation-in-part of Ser. No. 95,140, Sep. 11, 1987, Pat. No. 4,885,718.

[51] Int. Cl.$^5$ .............................. G06F 3/00; G06F 3/14
[52] U.S. Cl. .............................. 395/800; 395/325; 364/927.2; 364/935.2; 364/935.5; 364/940; 364/DIG. 2; 364/234; 364/237.2; 340/711; 375/36
[58] Field of Search .................. 395/325, 275, 800; 375/36; 340/711

[56] References Cited

U.S. PATENT DOCUMENTS

| | | | |
|---|---|---|---|
| 3,657,478 | 4/1972 | Andrews, Jr. | 178/63 E |
| 3,691,295 | 9/1972 | Fisk | 370/27 |
| 3,925,776 | 12/1975 | Swallow | 340/717 |
| 4,476,543 | 10/1984 | Quinones et al. | 395/325 |
| 4,520,356 | 5/1985 | O'Keefe et al. | 340/717 |
| 4,665,501 | 5/1987 | Saldin et al. | 395/275 |
| 4,907,146 | 3/1990 | Caporali | 364/132 |
| 4,974,075 | 11/1990 | Nakajima | 358/98 |

Primary Examiner—Thomas C. Lee
Assistant Examiner—Paul Harrity
Attorney, Agent, or Firm—Phillips & Beumer

[57] ABSTRACT

A communications extension link for use between a computer and display unit (K.D.U.) has at the computer site a first interface circuit connected to it and adjacent to the keyboard and display unit a second interface circuit connected to it. The two interface circuits may then be spaced up to 300 feet for a monochrome K.D.U. and up to 150 feet for a color K.D.U. by an extension cable. The first interface circuit includes capacitors connected between keyboard data and clock lines and a positive supply terminal, and TTL buffer amplifiers coupled in single ended configuration are placed in the signal lines relating to video information transmission. The video signals (VS, HS, primary RGB and second rgb) are then each attenuated prior to being passed over the longest cable run, after which they are received by a second interface circuit. The second interface circuit employs discrete resistors between clock and data lines and the positive supply terminal with the attenuated video signals received by discrete buffer amplifiers which amplify the signal and make it compatible with TTL inputs of the monitor. In addition, capacitance is added between the positive supply terminal and logic ground.

13 Claims, 4 Drawing Sheets

COMPUTER-MONITOR EXTENDED RANGE COMMUNICATIONS LINK FOR ATTENUATING AND SUBSEQUENTLY RESTORING HIGH FREQUENCY COMPONENTS OF TRANSMITTED VIDEO SIGNALS

CROSS REFERENCE OF RELATED APPLICATION

This application is a continuation-in-part of application Ser. No. 07/095,140, filed Sep. 11, 1987, which will issue as U.S. Pat. No. 4,885,718 on Dec. 5, 1989.

FIELD OF THE INVENTION

This invention relates generally to the coupling of signals between a computer and a keyboard and display unit, or K.D.U., and particularly to a communications link which enables the K.D.U. to be located at extended distances from the computer. In this case, the terminal contains either a monochrome or a color monitor driven by either TTL or composite monitor video signal levels.

BACKGROUND OF THE INVENTION

It is a convenient practice to physically separate a digital computer from the keyboard and display unit by which the computer is monitored and controlled. Actually the K.D.U. consists of two units, a cathode ray-type display and a keyboard. The cathode ray display or, as it is usually called, a monitor, and keyboard may be in the form of a single housed unit or, as more commonly today with microcomputers, the monitor and keyboard are separate. The most popular microcomputer presently in use is the IBM-PC microcomputer, and there are many units made by other manufacturers which generally employ the same or a similar arrangement for interconnecting a keyboard and monitor to a computer.

As a matter of convenience, there are separate electrical jacks on these computers for mating plugs, one plug connecting to a monitor cable and the other to a keyboard cable. The opposite ends of these cables have plugs which directly plug into a monitor equipped jack and a keyboard equipped jack. Normally these cables are on the order of four to six feet in length, enabling some, but limited, separation of a monitor-keyboard work station from a computer. This typically requires that the computer and work station be generally located together.

It is to be appreciated, however, that there are situations, in fact, many, where it is desirable to separate the computer and a work station. This may be by virtue of space limitations or because of environmental considerations, the latter sometimes including an inhospitable environment for a computer.

Separation has been attempted by extending the length of the separate connecting cables described above, but it has been found that where the separation is greater than, say, 12-16 feet, reliability is sacrificed. If a single cable housing both monitor and keyboard leads is attempted, as would be the ideal approach for greater distances, signal interaction becomes intolerable. Although it is believed many have attempted to solve the problems involved as they have been present for several years, insofar as applicants are aware, they have not succeeded and that no dual cable linkage system has been successfully employed beyond the 12–16-foot range, and no successful single ended TTL cable system has been accomplished other than by the applicants.

The applicants, and, it is believed, others, attempted to employ standard filtering techniques, as by adding capacitance between certain signal lines and ground. This simply does not work, and it appears that others simply gave up.

It is the object of this invention to provide an improved communications link by which a relatively long, single cable connects a computer with a keyboard and display unit and yet provides error-free communications.

SUMMARY OF THE INVENTION

In accordance with this invention, a single, elongated as needed, multi-conductor cable interconnects two discrete circuit assemblies, one being located near a computer and interconnected by separate cables to the keyboard and monitor terminals of the computer and the other circuit assembly, at an opposite end of the cable, being separately interconnected to a keyboard and monitor.

The first circuit assembly employs discrete capacitors connecting between keyboard data and clock lines and a positive supply terminal. In addition, a TTL buffer amplifier is employed in each of the horizontal sync, vertical sync, video, and intensity signal lines. In addition, the signal inputs to the video and intensity buffer amplifiers are fed through small value current limiting resistors.

The second circuit assembly employs discrete resistors from the clock and data lines and positive supply terminal, and a third and lower value resistor is connected between the vertical sync lead and logic ground. Further, capacitance is added between a positive supply terminal and logic ground.

In another embodiment of this invention, a single, elongated as needed, up to on the order of 150 feet for color video signals or 300 feet for monochrome video signals, multi-conductor cable interconnects two discrete signal conditioning circuit assemblies, one being located near a computer and interconnected to at least monitor terminals of the computer and the other signal conditioning assembly, at an opposite end of the cable, being separately interconnected to at least a monitor.

The first signal conditioning assembly employs a TTL buffer amplifier in each of the horizontal sync, vertical sync, primary RGB and secondary rgb signal lines. In addition, signal outputs from the buffer amplifiers are highly attenuated prior to being passed over the long cable to prevent them from inducing interference into adjacent conductors.

The second signal conditioning assembly employs termination circuit means to stabilize each of the video signals prior to inputting them into respective buffer amplifiers which amplify the signal prior to it being input to an RC network following each of the buffer amplifiers. These networks again attenuate the signal to reduce or eliminate the high frequency component therein which radiates EMF.

DETAILED DESCRIPTION OF THE DRAWINGS

Figure 1:
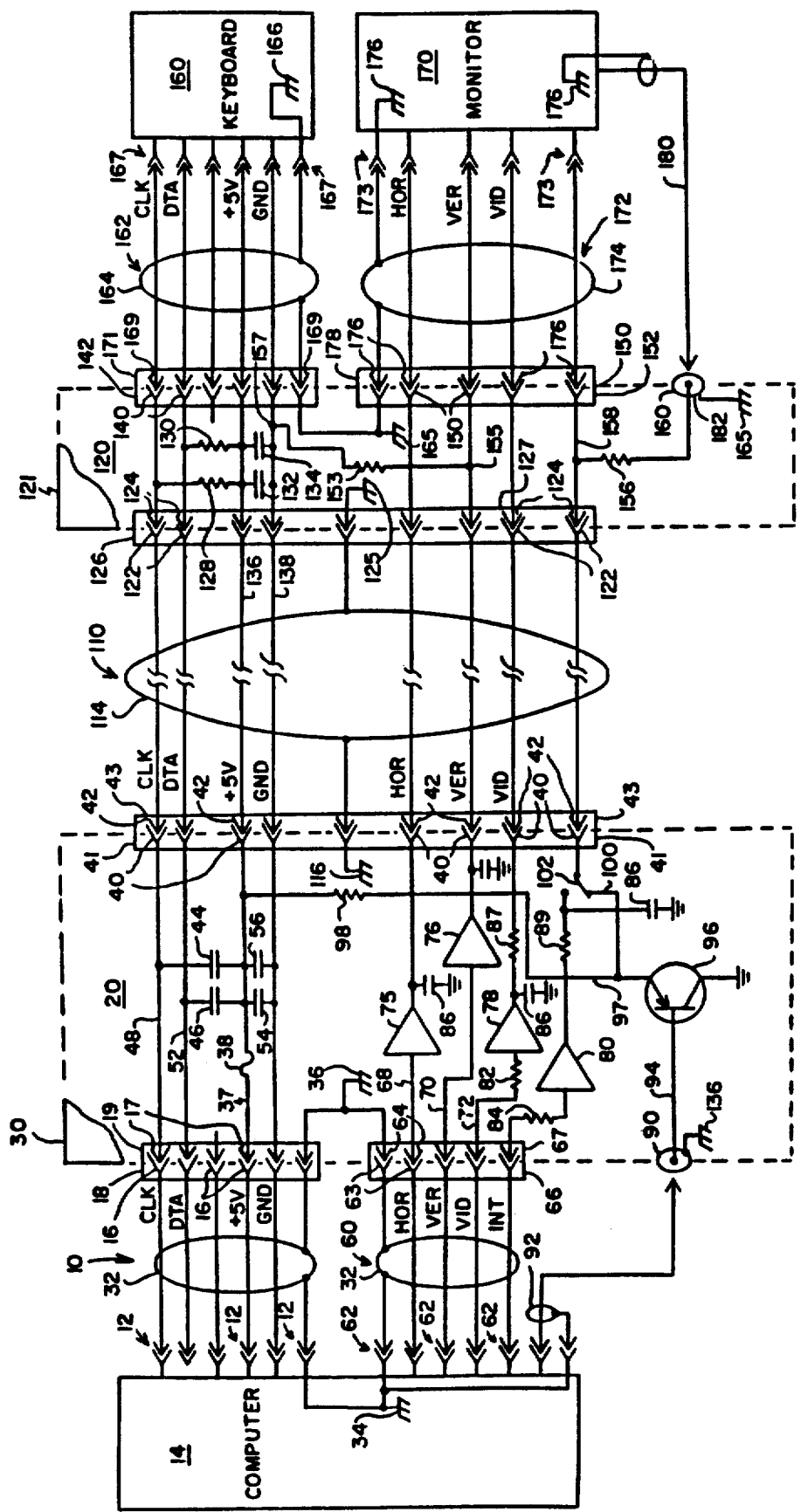
FIG. 1 is a schematic diagram of an embodiment of the invention where signal coupling is to a terminal combination employing a monochrome cathode ray display.

Referring to FIG. 1, a shielded cable 10 for a monochrome monitor is connected from keyboard input connector terminals 12 of computer 14 to receptacle terminals 16 housed in receptacle assembly 18. Receptacles 16 connect to plug terminals 17 of plug assembly 19 of signal conditioning circuit 20. Circuit 20 is located in housing 30 and, as labeled, connections to it are clock (CLK), data (DTA), +5 volts (+5 V) and logic ground (GND). Cable shield or sheath 32 of metal is connected to both chassis ground 34 of computer 14 and chassis ground 36 of housing 30. A +5-volt input is coupled from connector terminals 12 from computer 14 via receptacle 16 and plug 17 to lead 37 through fuse 38 to receptacle 40 of receptacle assembly 41. Receptacle 40 is coupled to plug 42 of plug assembly 43, which in turn couples the +5 v. to shielded cable 110. The clock, data, and logic ground leads are similarly connected between like labeled connector terminals 12 to receptacles 16 and plugs 17, which are directly connected to receptacles 40 and plugs 42. Significantly, it has been discovered that interference between the video lines and clock and data lines is substantially reduced by employment of capacitors 44 and 46, capacitor 44 being connected from clock lead 48 to the +5-volt lead 37 and capacitor 46 connected from data lead 52 to +5-volt lead 37. Capacitor 44 has a value of approximately 0.002 mfd, and capacitor 46 has a value of up to approximately 0.006 mfd. In addition, a relatively large capacitor 54, for example, 22 mf, is connected between +5-volt lead 37 and logic ground; and a smaller capacitor 56, for example, 0.1 mf, is also connected between these points. By this means, high frequency noise is shunted to ground via the smaller, faster-acting capacitor. The larger and slower-acting one is used to stabilize the +5-v. D.C. supply.

A second shielded cable 60 is connected from monitor output connector terminals 62 of computer 14 to functionally labeled receptacle terminals 63 mounted in receptacle assembly 66 and which connect to plug terminals 64 mounted in plug assembly 67 of signal conditioning circuit 20. As labeled, the monitor terminals are horizontal sync (HOR), vertical sync (VER), video (VID), and intensity (INT). Cable shield 32 is connected to chassis ground 34 of computer 14 and chassis ground 36 of circuit 20. Each of monitor leads 68, 70, 72, and 74 feed the input of a discrete TTL logic buffer amplifier (which switches high and low responsive to discrete high and low signal inputs) of amplifiers 75, 76, 78, and 80. The video input to amplifier 78 and intensity input to amplifier 80 are each fed through small, for example, 20 ohms, current limiting resistors, being resistors 82 and 84. These resistors effect a reduction in switching speed for the amplifiers to reduce output high frequency noise radiation. Each of the monitor signal leads, at the output of the amplifiers, is conventionally connected to ground through 22 pf (approximate) capacitors 86 as a means of reducing stray radiation, and there are small value, e.g., 33 ohms, resistors 87 and 89 in series with the outputs of amplifiers 78 and 80, respectively.

The outputs of amplifiers 75, 76, and 78 are connected to appropriately labeled signal outputs of receptacle terminals 40 of receptacle assembly 41.

A separate RCA-type jack 90 is mounted on housing 30 and is adapted to receive an RCA plug which feeds via a separate shielded cable 92 from a computer, e.g., computer 14, a composite video signal. A lead 94 from jack 90 is connected to the base input of a grounded collector transistor amplifier 96. It is powered through its emitter, being connected by lead 97 through resistor 98 to +5 volt lead 37 and a signal lead 100 connects the emitter to one terminal of selector switch 102. A second input to this switch is connected to the output of intensity amplifier 80. Thus, switch 102 provides on an output terminal of terminals 40, a video intensity signal, or an amplified composite video signal as desired.

A single, shielded, multi-conductor cable 110 has plug terminals 42 plugged into receptacles 40 of circuit 20. Its shield 114 is connected to chassis ground 116, and other leads are connected as labeled. Cable 110 thus includes all leads for both keyboard and monitor, and it may be made for extended range, for example, 50 to 150 feet or greater, terminating at a second signal conditioning circuit 120 where its receptacle terminals 122, mounted in receptacle assembly 126, mate with plug terminals 124, which are mounted in plug assembly 127.

Signal conditioning circuit 120 is mounted within housing 121, and like labeled leads of cable 110 are connected to like functions clock, data, +5-volt logic ground, vertical sync, horizontal sync, video, and intensity plug terminals 124. Shield 114 connects to chassis ground 125. Clock and data leads of the keyboard circuit are connected to +5 volts through resistors 128 and 130, each being closely approximate to 1,000 ohms. This serves to provide additional power to assist the keyboard (160) in raising the clock and/or data line voltage. Capacitor 132, for example, 22 mf, and a smaller capacitor 134, for example, 0.1 mf, are connected between +5 volts lead 136 and logic lead ground 138. The keyboard leads directly interconnect between plug terminals 124 of plug assembly 127 and like function receptacle terminals 140 mounted in receptacle assembly 142. The monitor related leads are directly connected between plug terminals 124 of plug assembly 127 and a discrete one of receptacle terminals 150 mounted in receptacle assembly 152, input and output leads functionality being maintained. A resistor 153, for example, 150 ohms, is connected between vertical sync terminal 155 and a logic ground terminal 157.

A small resistor 156, for example, 68 ohms, is connected between lead 158 and an output jack, for example, an RCATM jack 160, the outer shield portion of which is connected to ground. This jack provides an output for composite video when switch 102 of circuit 20 is switched to a lower position.

Keyboard 160 is coupled to signal conditioning circuit 120 via a shielded cable 162 having an enclosing shield 164 connected between conditioning circuit ground 165 and keyboard ground 166. The leads of this cable extend from keyboard receptacle terminals 167 and, as functionally labeled, terminate in plug terminals 169 mounted in plug assembly 171. These leads are plugged into receptacles 140 of signal conditioning circuit 120. This thus completes a keyboard circuit between keyboard 160 and computer 14.

Monochrome monitor 170 is similarly connected to signal conditioning circuit 120 via a shielded cable 172 connecting from receptacle terminals 173 of monitor 170 to signal conditioning circuit 120. Shield 174 of cable 172 is connected to chassis ground 176 or monitor 170 and to chassis ground 165 of signal conditioning circuit 120. The function of each of the leads of cable 172 is labeled, and each lead connects to a plug terminal 176 mounted in a plug assembly 178 which plugs into a receptacle assembly 152 having receptacles 150 connected to signal conditioning circuit 120. In addition, single lead shielded cable 180 provides an optional composite of video input to monitor 170, this cable being pluggable into receptacle 182. By the connection of monitor 170 to signal conditioning circuit 120, a circuit is completed between computer 14 and monitor 170.

By virtue of the combination of the two signal conditioning circuits described, shielded cable 110 enables a computer and terminal, or work station, to be widely separated. Tests thus far have shown that this distance can be up to 300 feet and probably may be longer. Interaction between monitor and keyboard circuits have been conditioned by the unique arrangement illustrated in a manner which provides adequate signal levels for communication and at the same time reduces interaction between circuitry elements to a point which enables error-free communications between a keyboard and computer and between a computer and monitor.

Figure 2:
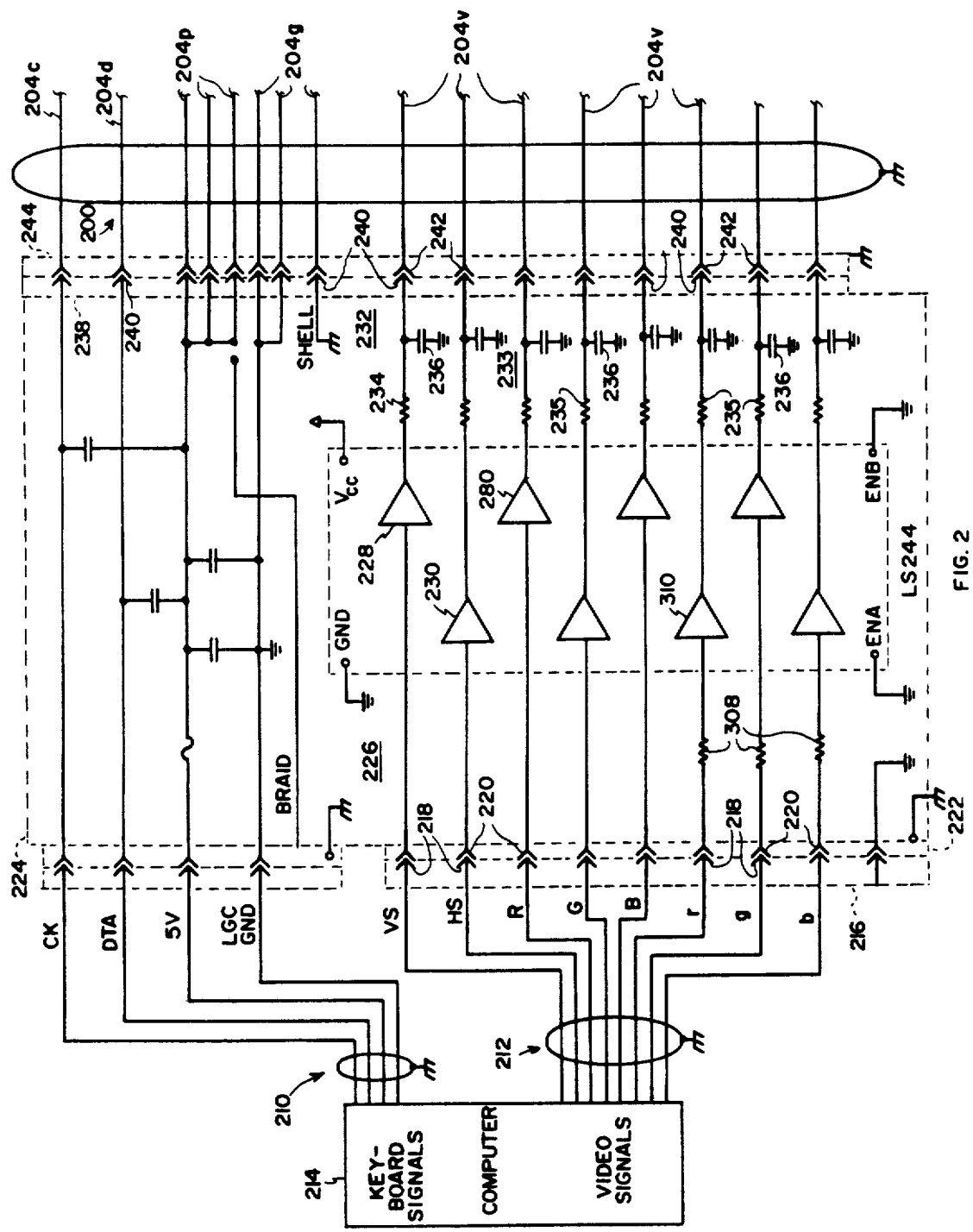
FIG. 2 is a portion of a schematic diagram of another embodiment thereof wherein coupling circuitry is disclosed for coupling a computer to a remotely located color or monochrome K.D.U.
Figure 3:
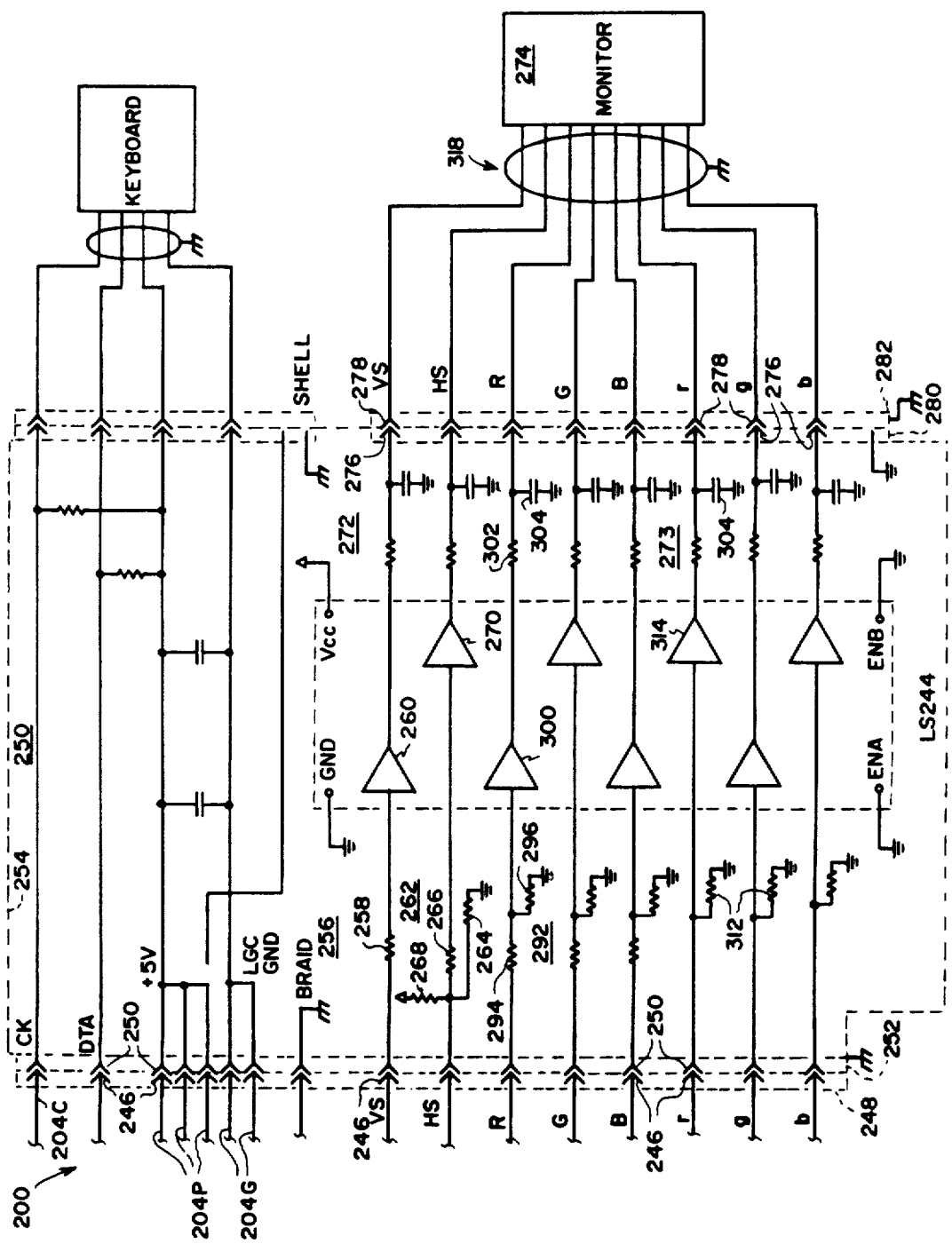
FIG. 3 is a continuation of that portion shown in FIG. 2.

In the instance where digital color monitors are being used in a K.D.U. (keyboard display unit), FIGS. 2 and 3 illustrate an extended range cable 200 and associated signal conditioning circuitry at each end thereof that is capable of extending the color K.D.U. a distance of up to 150 feet from the computer. It is to be noted that this particular circuitry is also capable of extended monochrome transmissions of up to distances of 300 feet. It is to be further noted that in the instance where a monitor is to be used as a stand-alone component, such as in an inhospitable environment where it is desired only to provide a computer display, external +5-volt power would be provided to the signal conditioning circuitry via the keyboard power connection, with clock and data lines left unconnected.

Figure 5:
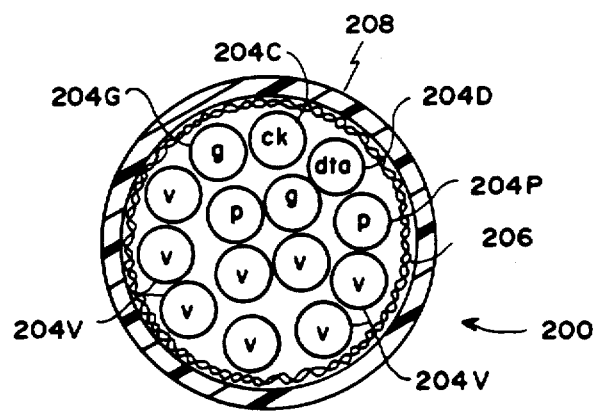
FIG. 5 is an illustration of a particular method for shielding keyboard clock and data signal lines from adjacent video signal lines in a cable.

When a keyboard is used, FIG. 5 illustrates a novel method for shielding keyboard clock and data signals from adjacent video carrying conductors. Cable 200 is a conventional cable constructed of multiple, insulated conductors 204 which maintain their relative position over the length of cable 200, and which is less expensive than conventional twisted pair cables used by most manufacturers, with cable 200 being shielded from electromagnetic interference by braided and foil shields 206 disposed around conductors 204. A flexible, insulative cover 208 in turn covers and protects shield 206 and conductors 204. Applicants have discovered that by applying keyboard clock and data signals to adjacent conductors 204c and 204d and then applying keyboard +5 volt power and ground potentials as shown to interposing conductors 204p and 204g, that the interposed conductors 204p and 204g effectively shields radiation from keyboard clock and data signals from color video information applied to conductors 204v.

With keyboard circuitry remaining as described above in a separate cable 210 from computer 214 (FIGS. 2 and 3), a shielded cable 212 (shield not shown for convenience) for carrying video signals is coupled from computer 214 by plug 216 having terminals 218 connected to terminals 220 of receptacle 222. Receptacle 222 (dashed lines) is supported by computer 214, with terminals 220 connecting to signal conditioning circuity 226 housed in enclosure 224 via cable termination pad 227. Keyboard signals, when used, are routed to respective conditioning circuitry via termination pad 211. As described, receptacle 222 provides connections via terminals 218 and 220 for vertical sync signals (VS), horizontal sync signals (HS), and primary and secondary color video signals which include primary Red, Green, Blue, designated by R, G, and B, and secondary red, green, blue, designated r, g, and b, chassis ground and logic ground. These color video signals are used in at least two common color monitor systems, the color graphics adapter (CGA) system and enhanced graphics adapter (EGA) system. In the CGA system, the primary R, G, and B lines carry color video information, with the secondary g line carrying an intensity signal. Typically, in this system, the primary R, G, and B lines carry varying, independently discrete color signals, while the intensity signal on g fluctuates between high and low states and acts upon color guns turned "on" to vary their intensity simultaneously, making possible 16 different colors.

In the EGA system, on the other hand, and in addition to the primary R, G, and B signals, secondary r and b signals are provided in addition to the g signal, all of which may be varied independently from one another and additionally may be turned on independent from the primary R, G, and B signals, making possible 64 different colors.

Dealing first with sync signals, it is seen that the terminals 220 labelled VS and HS of cable 212 couple vertical and horizontal sync signals VS and HS to respective TTL buffer amplifiers 228 and 230. Amplifiers 228 and 230 accept varying quality signals from various types of computers and serve to make these signals compatible with applicants' TTL transmission scheme. After being amplified, the sync signals VS and HS are passed through discrete RC networks 232 consisting of a series resistor 234 having a value of approximately 68 ohms and being coupled to a capacitor 236 connected to ground having a value of between 330 picofarads and 680 picofarads, with 470 picofarads being preferred. This capacitance range is maintained for all of RC networks 232 and 233, with the larger resistance of 68 ohms used because of the slower frequency of sync signals as opposed to faster video signals. The corresponding RC networks 233 which attenuate the faster video signals use a smaller resistor, 20 ohms. These RC network effects interference reduction by attenuating the high frequency components of the signal in order to reduce electromagnetic interference. Applicants have found that these high frequency components are not necessary to digitally transmit color or monochrome video signals over long cable runs, as will be described. Sync signals VS and HS are then output to a receptacle 238 housing terminals 240 coupled to terminals 242 in plug receptacle 244 and being connected to conductors 204v of cable 200. Cable 200, as stated, may be as long as 150 feet for a color K.D.U. or up to 300 feet for a monochrome unit.

At the K.D.U. end 251 of cable 200 (FIG. 3), the sync signals VS and HS are coupled via terminals 246 of plug 248 through receptacle terminals 250, with receptacle 252 supported by a second enclosure 254 (dotted lines) to a second signal conditioning circuit 256 housed in enclosure 254. The VS signal, being approximately 60 Hertz, is simply passed through a 1K ohm series resistor 258 which limits current to the following buffer amplifier 260. The HS signal, having a frequency in the low to mid KHz range, typically between 10-30 KHz for most digital monitors, is passed through a termination network 262 consisting of a 1K ohm parallel-to-ground resistor 264 and a series coupled 510 ohm resistor 266. In some instances where certain types of K.D.U.s are used with long cable lengths, it is necessary to include a 1K pull-up resistor 268 coupled to +5 volts to stabilize the pulses and prevent time shift of sync pulses caused by crosstalk superimposed thereon.

After signals VS and HS are passed by the 1K resistor 258 and through termination network 262, they are input to TTL buffer amplifiers 260 and 270. These amplifiers are Schmitt triggered with a 400 mv hysteresis deadband, an example of which being the 74LS 244 integrated circuit, and which serve to amplify the sync signals and produce clean, fast VS and HS transitions from the attenuated VS and HS signals. This process brings signal levels up to TTL compatible levels of the monitor and eliminates noise accumulated over the long cable run. After being amplified, the signals are again attenuated by being passed through RC networks 272. As before, these networks serve as roll-off filters to limit EMI radiation by eliminating high frequency components of the signal prior to being input to color monitor 274 via terminals 276 and 278 of receptacle 280 and plus 282, respectively. As with receptacle 252, receptacle 280 is supported by enclosure 254.

Figure 4:
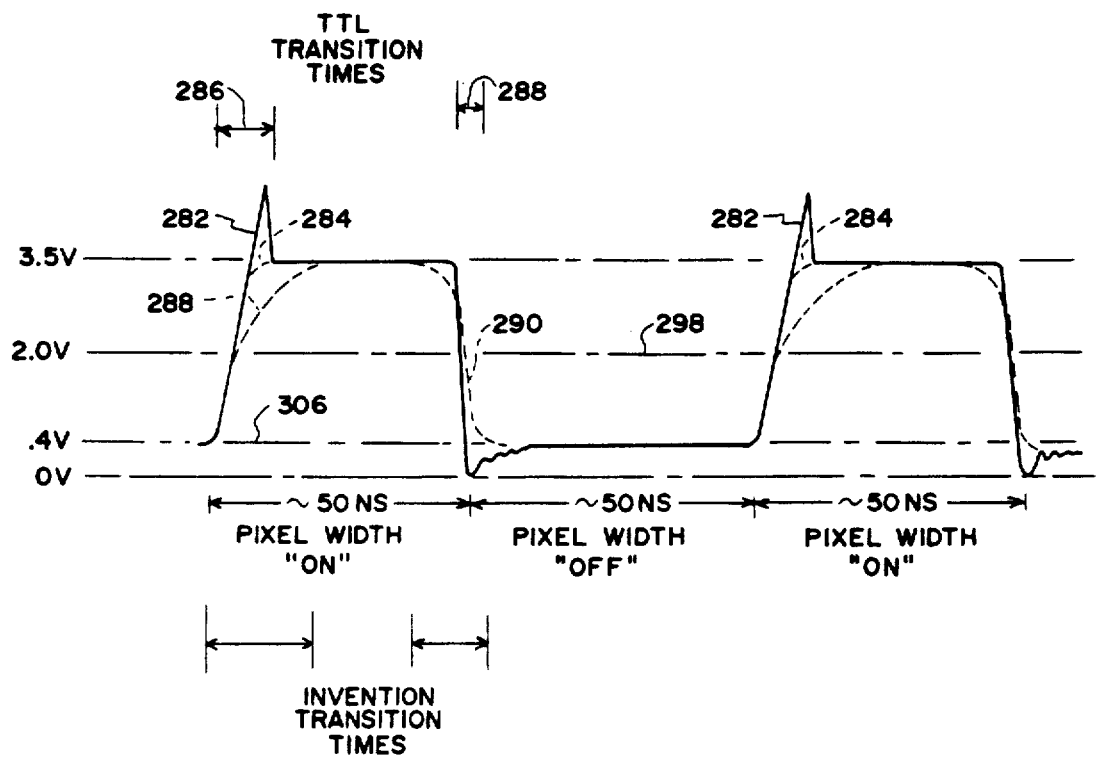
FIG. 4 is a waveform of pixel width or frequency, showing typical TTL video signals contrasted with applicants' signals.

Treatment of the primary R, G, and B signals will be undertaken next. These three signals control red, green, and blue color guns of the monitor and are treated in like manner en route from computer to K.D.U. Examining the primary red signal route, it being representative of the green and blue signal routes, it is seen that it is simply input via terminals 218 and 220 to computer video output cable 212, and designated R, to a TTL buffer amplifier 280 in an open ended configuration, meaning that only one wire is needed to transmit the red video information from amplifier 280. This is contrasted with the prior art which generally utilizes differential line drivers which require two wires per signal. Significantly, and referring to FIG. 4, since TTL signals are prone to cause induced noise in adjacent conductors due to their fast rise and fall times, typically in the low nanosecond range between 5-15 nanoseconds, applicants have found that by increasing capacitance of the standard RC networks 232 and 233 following buffer amplifier 280 by a factor of approximately 10, to 470 pf, they can attenuate that portion of the transmitted video signal which is greater than the dot-clock frequency (or pixel rate) of the monitor. This frequency varies between different manufacturers of monitors and is generally in the 10-30 MHz range. FIG. 4 illustrates the worse case frequency for an 18 MHz monitor having a pixel frequency of approximately 50 nanoseconds, this situation being when such a signal is transmitted by computer 214 to trigger "on" every other pixel in the monitor display. As shown, the normally sharp rising and falling edges of the standard TTL signal normally used for color monitors, and which is responsible for the greatest portion of interfering radiation, contains an overshoot region 282 inherent in most TTL switching devices. This is clipped by attenuation networks of the prior art to form a signal shown by dashed lines 284. However, this still results in a signal having a fast TTL rise time 286 and an even shorter fall time 288 which, while being desirable in digital circuitry, radiates EMI at frequencies determined by the rise and fall time. Of course, with an RC network having a fixed capacitance, the higher the pixel frequency, the more attenuation is achieved. In applicants' circuitry, the capacitance thereof is selected to provide minimal attenuation at 10 MHz, 50 percent attenuation at 20 MHz, and 70 percent attenuation at 30 MHz. Thus, applicants' video signals are provided with slow rise and fall times 288 and 290, respectively (dotted lines), which have been shown to drastically reduce high frequency components of radiated EMI. In other words, the rise time of the signal from buffer 280 is spread out by network 233 over a time period far longer than what is considered acceptable for use with TTL logic components. Because of this, some phase shifting occurs due to the highly attenuated signal, but because the signal ultimately is displayed on a monitor and the shifts are in the nanosecond range, they are undetectable to the eye. This technique, in addition to reducing EMI by eliminating high frequency components of the signals, allows applicants to transmit color digital intelligence over long, adjacent conductors without significant interference, or crosstalk, therebetween.

After being amplified and attenuated as described by amplifier 280 and RC network 233 (FIG. 3), the primary Red signal (R) is coupled as described to a single conductor 204v of 150-foot cable 200 and coupled as described to signal conditioning circuitry 256. Here, the primary Red signal first passes through a termination network 292 consisting of a series connected 33 ohm resistor 294 and a parallel-to-ground 150 ohm resistor 296. This network serves to limit overshoot of the signal and provides some current drain to eliminate any crosstalk that occurs over the 150 feet of conductor 204v. At this point, the discrete digital signals have a peak potential of between 3.0 and 3.5 volts, well above the 2.0-volt threshold 298 (FIG. 4) necessary to trigger "on" the following amplifier 300, which is also a Schmitt triggered buffer amplifier having a 400 millivolt hysteresis deadband (74LS 244).

Upon examining FIG. 4 at this point, it will become apparent that as applicants' video signal, substantially shown in dotted lines, and as received by signal conditioning circuitry 256, will have been phase shifted only a small amount in comparison to the total pixel width of approximately 50 nanoseconds, probably less than 10 nanoseconds from the standard TTL signal at the point where it crosses threshold 298, triggering "on" amplifier 300. At this point, the attenuated signal shown in dotted lines will reproduce a phase shifted TT1 signal as shown which is shifted by 10 nanoseconds or less. To reduce EMI radiation of this reconstructed signal, applicants degrade the high frequency portion thereof. Buffer 300 amplifies the signal to a voltage level of approximately 3.5 volts, cleaning up the signal and buffering monitor termination network 274. After being amlified, the signal is fed to one of RC networks 272 consisting of a series connected 33 ohm resistor 302 and a coupled-to-ground connected capacitor 304. The capacitance of capacitor 304 is selected to be between 47 and 560 picofarads, with 470 picofarads being typical. The lower range of capacitance with respect to attenuation networks 232 and 233 is due to the shorter cable 318 coupled to monitor 274. This network again reduces the EMI radiation by clipping the high frequency components of the signal as described. The phase shift 306 (FIG. 4) caused by attenuation network 304 (FIG. 2) is cummulative with the same phase shift from attenuation networks 232 and 233 (FIG. 3). However, as described, phase shift errors induced thereby on discrete pixels may be ignored because they cannot be detected by the eye when displayed on a monitor.

Treatment of the secondary rgb video signals will now be undertaken. Inasmuch as they are treated the same with respect to each other, slight differences exist between treatment in general between primary and secondary color video signals. Examining first the secondary red (r) video signal, it being representative of the green and blue secondary signal routes, it is input to signal conditioning network 226 from the computer at terminal 218, designated r, of receptacle 222. Thereafter, the secondary red signal, being a weaker signal than the primary R signal, is passed through a 100-ohm resistor 308 which serves to attenuate the square wave signal to avoid high frequency induced crosstalk. Next, the secondary red signal is input to a TTL buffer amplifier 310 coupled in open ended configuration for reasons described, which amplifies the signal prior to passing it to one of RC networks 232. Network 232 is a like network to that described for the primary Red signal and used for the same purpose, i.e., EMI reduction and signal attenuation. The signal then passes to terminals 240 and 242 of plug 238 and receptacle 244 and thereafter to the 150-foot conductor 204v in cable 200. After passing through terminals 246 and 250 of plug 248 and receptacle 252 at the K.D.U. end (FIG. 3), the secondary red signal is terminated by 100 ohm termination resistor 312, which eliminates induced crosstalk superimposed on the signal by providing a slight current drain. The signal is then input to the integrated circuit containing another Schmitt trigger buffer amplifier (74LS 244) 314 which again buffers the termination networks of monitor 274. After being amplified, the secondary red signal is passed through one of RC networks 273 utilizing a 20 ohm resistor 316, with network 273 used as described for the primary red signal for the same purpose, i.e., EMI reduction and clipping of the high frequency component of the secondary rgb signals. It should be noted, however, that selection of 470 picofarad capacitance for capacitors 314 is not as critical as is the selection of capacitance of capacitor 236 of networks 233 due to the shorter cable length of cable 318 from monitor 274 connecting plug 282 to receptacle 280. As stated, these capacitors may have values that range from 47 to 560 picofarads.

From the foregoing, it is apparent that the applicants have provided circuitry for remotely coupling a color K.D.U. a distance of up to 150 feet from the computer, the circuitry being inexpensive and easy to manufacture while providing reliability of operation.

After having described our invention and the manner of its use, it is apparent that incidental changes may be resorted to that fairly fall within the scope of the following appended claims.

We claim:

1. A communications link for coupling at least video signals comprising horizontal sync (HS), primary RED, GREEN, and BLUE and secondary red, green, and blue signals from a computer to a distantly located monitor, comprising:

a plurality of first discrete amplification means, one of each said first amplifications means coupled to one of each said HS, primary RED, GREEN, and BLUE, and secondary red, green, and blue signals, with a selected resistance in series between said secondary red, green, and blue signals and respective said first amplification means, for amplifying said video signals from said computer;

a plurality of discrete attenuation means, one of each said attenuation means coupled to one of each said plurality of first amplification means, for attenuating high frequency components of said video signals which radiate interfering crosstalk from one adjacent conductor to another and for providing attenuated video signals;

a cable having a plurality of discrete, adjacent conductors, one of each said conductors coupled to one of each of said plurality of attenuation means and being up to 300 feet long, said plurality of conductors conveying said attenuated video signals;

a plurality of discrete cable termination means, one of each said cable termination means coupled to one of each said conductors conveying a corresponding said attenuated video signal, for reducing crosstalk; and a plurality of second discrete amplification means, one of each said second amplification means coupled to one of each said cable termination means, for receiving said attenuated video signals from said plurality of said cable termination means and having a selected voltage threshold such that when a terminated, attenuated video signal rises to and above said threshold, said second amplification means is triggered "on", for restoring said high frequency components to said video signals and providing said restored video signals to said monitor.

2. The communications link as set forth in claim 1 wherein said first amplification means comprises a discrets digital buffer amplifier connected to each of said video signals.

3. The communications link as set forth in claim 1 wherein said selected resistance is 100 ohms.

4. The communications link as set forth in claim 1 wherein said attenuation means comprises for said HS signal, a 68-ohm resistor, and a following capacitor in the range of 330–680 picofarads coupled between the HS signal and ground, and for primary RED, GREEN, and BLUE and secondary red, green, and blue signals, a 20-ohm series resistor and a following capacitor in the above-stated range coupled between the signal and ground.

5. The communications link as set forth in claim 1 wherein a distantly located keyboard is coupled to said computer via said cable with one of each of keyboard signals clock and data and one of each of keyboard potentials power and ground are applied to one of each of discrete and separate said conductors of said cable other than said conductors conveying said video signals.

6. The communications link as set forth in claim 5 wherein said conductors conveying the video signals primary RED, GREEN, and BLUE, secondary red, green, and blue, and HS are shielded from interfering keyboard crosstalk from conductors conveying keyboard clock and data signals by interposed conductors conveying keyboard power and ground potentials.

7. The communications link as set forth in claim 1 wherein said cable termination means comprises, for said HS signal, a 510-ohm series resistor coupled in parallel with a 1K ohm resistor to ground, for each said primary RED, GREEN, and BLUE signals, a 33-ohm series resistor and a 150-ohm parallel resistor coupled between each said primary RED, GREEN, and BLUE signals and ground, for each said secondary red, green, and blue signals, a 100 ohm parallel resistor coupled between each said secondary red, green, and blue signals and ground.

8. The communications link as set forth in claim 1 wherein said second amplification means comprises a Schmitt triggered buffer amplifier having a 400 mv deadband, such as the 74LS 244 integrated circuit.

9. A communications link for coupling keyboard and monitor terminals of a computer to a distantly located keyboard and display unit comprising:
- a first signal conditioning assembly coupled to said computer and disposed for receiving keyboard clock and data signals, positive bias voltage, logic ground, chassis ground, and video signals comprising primary Red, Green, and Blue and secondary red, green, and blue, and horizontal sync (HS) and vertical sync (VS) logic signals, said first signal conditioning assembly comprising:
  - a first capacitor connected between said keyboard clock signal and said positive bias voltage, and a second capacitor connected between said keyboard data signal and said positive bias voltage, third and fourth capacitors coupled in parallel between said positive bias voltage and said logic ground;
  - a plurality of discrete logic amplifiers, one of each said logic amplifiers connected to one of each said VS, HS, primary RED, GREEN, and BLUE, and secondary red, green, and blue signals, with a series resistor coupled to each input of said secondary red, green, and blue signals; and
  - a plurality of first attenuation circuit means, one of each said first attenuation means responsive to one of each said logic amplifiers, for attenuating components of amplified VS, HS, primary RED, GREEN, and BLUE, and secondary red, green, and blue signals in excess of a dot clock frequency of a monitor of said keyboard and display unit;
- a cable having a plurality of discrete conductors, one of each said conductors coupled at one end to one of each said plurality of first attenuation means and to said terminals of said computer providing said keyboard clock and data signals, said positive bias voltage, said logic ground and said chassis ground, for receiving and conveying said keyboard clock and data signals, said logic ground potential, said chassis ground potential, said positive bias voltage, and attenuated VS, HS, primary RED, GREEN, and BLUE and secondary red, green, and blue signals to an opposite end of said plurality of conductors, said cable being up to 150 feet long for a color keyboard and display unit and up to 300 feet long for a monochrome keyboard and display unit;
- a second signal conditioning circuit assembly coupled at said opposite end of said plurality of conductors to said keyboard and display unit and disposed for receiving said keyboard clock and data signals, said positive bias voltage, said logic ground potential, said chassis ground potential and attenuated VS, HS, primary RED, GREEN, and BLUE, and secondary red, green, and blue signals, from said conductors of said cable, said second signal conditioning circuitry comprising:
  - a first resistor connected between said clock signal and said positive bias voltage and a second resistor connected between said data signal and said positive bias voltage;
  - fifth and sixth capacitors coupled in parallel between said positive bias voltage and said logic ground;
  - a plurality of termination circuit means, one of each said termination means coupled to one of each said conductors conveying said attenuated VS, HS, primary RED, GREEN, and BLUE, and secondary red, green, and blue signals from said cable, for stabilizing said signals and removing noise therefrom;
  - a plurality of buffer amplifier means, one of each said buffer amplifier means coupled to one of each said termination means, each said buffer amplifier means provided with a selected voltage threshold such that each said buffer amplifier means is triggered to an "on" logic state when a corresponding input voltage rises above said threshold, for reshaping the VS, HS, primary RED, GREEN, and BLUE and secondary red, green, and blue signals from said plurality of termination means; and
  - a plurality of second attenuation means, one of each said second attenuation means coupled to one of each said plurality of buffer amplifier means for further attenuating the components of said amplified VS, HS, primary RED, GREEN, and BLUE and secondary red, green, and blue signals in excess of the dot clock frequency of said monitor and providing said attenuated video signals to said keyboard and display unit.

10. The communications link as set forth in claim 9 wherein said keyboard clock and data signals are applied to a first group of adjacent first and second conductors of said cable, said cable comprising a second group of said conductors conveying said video signals, with power and ground potentials applied to others of said conductors interposed between said first and second groups, whereby said conductors conveying said keyboard clock and data signals and said conductors conveying said video signals are shielded from one another by said interposed conductors having said power and ground potentials applied thereto.

11. The communications link as set forth in claim 10 wherein said buffer amplifier means comprises a Schmitt triggered device having a 400 mv deadband between on and off logical states, and said selected voltage threshold is 2.0 v.

12. The communications link as set forth in claim 9 wherein one of each of said plurality of first attenuation means each comprises a series resistor from 20 ohms to 33 ohms and a following capacitor coupled in parallel between logic ground and one of each of the video signals VS, HS, primary RED, GREEN, and BLUE, secondary red, green, and blue, said capacitor having a capacitance of between 330 picofarads and 680 picofarads.

13. The communications link as set forth in claim 9 wherein each said plurality of second attenuation means each comprises a series resistor from 20 to 33 ohms and a following capacitor coupled in parallel between logic ground and one of each of the signals VS, HS, primary RED, GREEN, and BLUE, secondary red, green, and blue, said capacitor having a capacitance of between 47 and 560 picofarads.

* * * * *